(12) United States Patent
Ghani et al.

(10) Patent No.: US 8,391,472 B2
(45) Date of Patent: Mar. 5, 2013

(54) ACOUSTIC ECHO CANCELLATION SOLUTION FOR VIDEO CONFERENCING

(75) Inventors: Adnan Nabeel Ghani, North Hollywood, CA (US); Emmanuel C. Francisco, Pasadena, CA (US)

(73) Assignee: DreamWorks Animation LLC, Glendale, CA (US)

( * ) Notice: Subject to any disclaimer, the term of this patent is extended or adjusted under 35 U.S.C. 154(b) by 1645 days.

(21) Appl. No.: 11/810,836

(22) Filed: Jun. 6, 2007

(65) Prior Publication Data

US 2008/0304653 A1  Dec. 11, 2008

(51) Int. Cl.
*H04M 9/08* (2006.01)

(52) U.S. Cl. .......... 379/406.13; 379/406.08; 379/406.14

(58) Field of Classification Search . 379/406.01–406.16
See application file for complete search history.

(56) References Cited

U.S. PATENT DOCUMENTS

| | | |
|---|---|---|
| 5,680,450 A | 10/1997 | Dent et al. |
| 6,496,581 B1 * | 12/2002 | Finn et al. ................ 379/406.01 |
| 6,724,736 B1 | 4/2004 | Azriel |
| 6,738,358 B2 | 5/2004 | Bist et al. |
| 6,931,123 B1 | 8/2005 | Hughes |
| 6,990,084 B2 | 1/2006 | Hayward |
| 7,046,794 B2 | 5/2006 | Piket et al. |
| 2003/0235294 A1 * | 12/2003 | Dyba et al. ................ 379/406.01 |

* cited by examiner

*Primary Examiner* — Duc Nguyen
*Assistant Examiner* — Ibraham Sharifzada
(74) *Attorney, Agent, or Firm* — Morrison & Foerster LLP

(57) ABSTRACT

Echo cancellation for audio/video conferencing uses an inaudible tone added at an originating conference site to the transmitted voice signal, for echo cancellation. The tone, upon receipt with the voice signal at a remote conferencing site and retransmission back to the originating site, is used to determine both the round trip delay of the conferencing link and the acoustic characteristics of the remote site, so as generate an echo cancellation signal for better audio performance.

36 Claims, 8 Drawing Sheets

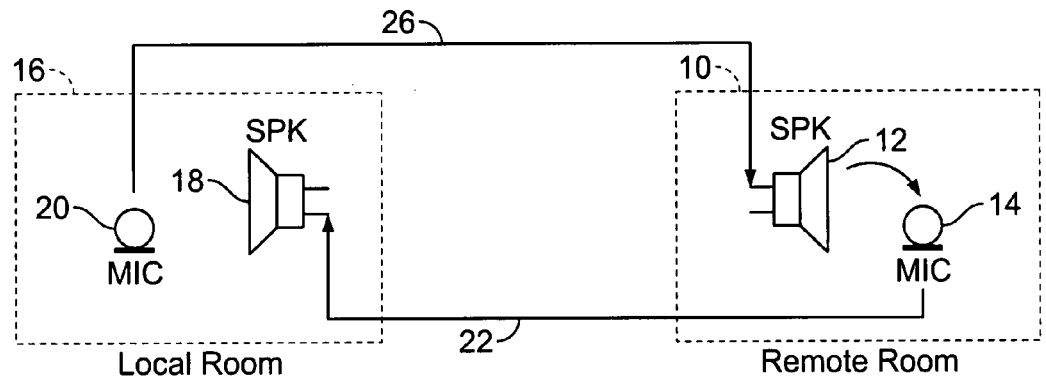
FIG. 1
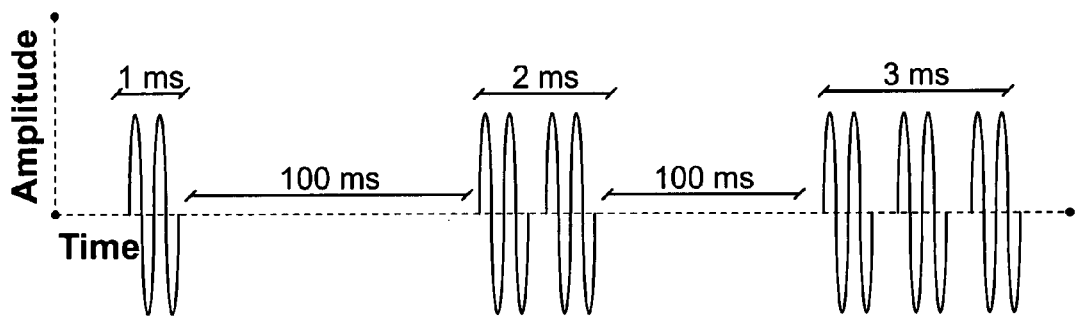
FIG. 2
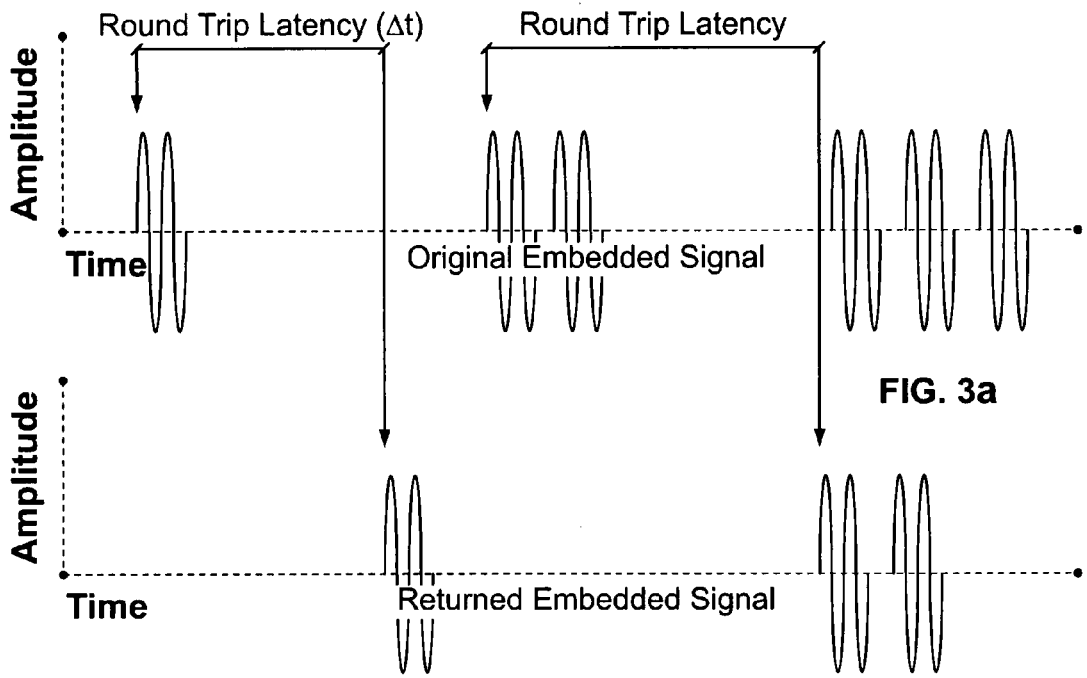
FIG. 3a
FIG. 3b

ACOUSTIC ECHO CANCELLATION SOLUTION FOR VIDEO CONFERENCING

FIELD OF THE INVENTION

This invention relates to audio and video teleconferencing and especially to audio echo cancellation.

BACKGROUND

The nature of video and audio teleconferencing creates a well known problem with the audio: acoustic echo return from the remote site, as shown in FIG. 1. Without an active cancellation system, the conferencing room becomes unusable due to distracting audio feedback from the remote site. In FIG. 1, at the remote conferencing room (site) 10, the loudspeaker 12 audio output inevitably is picked up by the room microphone 14 and returns via conferencing link 22 to the local room (site) 16 via its loudspeaker 18 as an undesirable "echo" picked up by its microphone 20, for repeating via return link 26.

Most present audio or video conferencing systems that attempt to deal with this problem employ an active filtering device known as an AEC or "Acoustic Echo Canceller" to handle unwanted echo. This uses a digital signal processing (DSP) electronic cancellation of unwanted echo (or an analog signal processing version), performed at the remote site for the local room.

In other words, the local listener ideally hears no echo because the remote room's AEC unit cancels the echo for the local listener. This cancellation is mirrored by the local room's AEC unit for the remote listener.

Current AEC devices have several significant limitations: They do not take network and compression latency (delay) into account, and therefore a "lag" in the echo cancellation sometimes causes echoes. They rely on actual microphone input (the user's voices) to model and create a "simulated echo" which is then used to cancel the actual echo. This approach fails when a "double-talk" situation happens (when users in both rooms talk at the same time). They are not optimized for a multi-point connection (one to many rooms) where different delays and different room acoustic characteristics are present.

SUMMARY

For improved latency (transmission delay) determinations and also for conferencing room acoustic characterizations, the present apparatus and method characterize the room and system environment by using a known but humanly inaudible acoustical tone. The system embeds an inaudible and periodic tone in the outgoing audio (voice) signal being transmitted to the remote site, and when that tone returns from the remote site to the originating site as an echo, it is processed for echo cancellation. Instead of using voice signal based cancellation (which is inherently randomly generated), the present system uses a sequence of inaudible pure (single frequency) acoustical tones (e.g., in a range of 250 Hz to 16 KHz frequency) bursts, which are a known constant signal. This embedded tone is thereby in-band with the transmitted user audio signal and requires no additional stream of data. It is transparent to the users. The tone sequences are humanly inaudible because each tone has a very short duration of, e.g., 1 to 5 ms. Each individual tone burst is of a single frequency, but typically over a brief period of time (such as less than one second) the system steps the bursts through the predetermined range of frequencies.

BRIEF DESCRIPTION OF THE DRAWINGS

FIG. 1 shows a prior art conferencing system.
FIG. 2 shows a waveform of a tone used in accordance with the invention.
FIGS. 3a, 3b show further waveforms illustrating the difference in time of the returned vs. original signal, updated, e.g., each 100 ms.
FIG. 6 shows in a block diagram the echo cancellation apparatus of FIG. 5a.

DETAILED DESCRIPTION

Figure 4A:
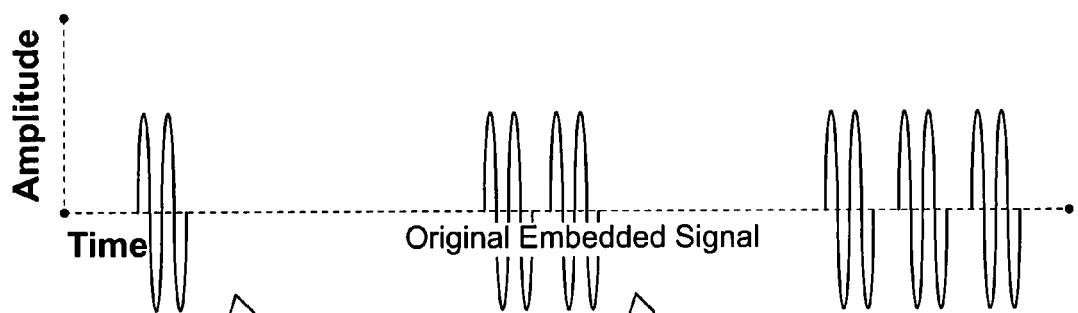
FIGS. 4a, 4b, 4c show waveforms of how the tone upon return is extracted from the incoming voice signal.

FIG. 2 illustrates the present inaudible tone as a waveform which is a set of periodic, sequenced pure (single frequency) tones (bursts) which are injected into the conventional conferencing audio signal at the local site with each burst lasting for, e.g., less than 2 ms, making them inaudible to human ears. This inaudible sequence of tones is thereby mixed with the conventional room audio signal and transmitted to the remote site via a conventional link (network) as in FIG. 1, where it is played on the loudspeaker at the remote site, then picked up by the microphone at the remote site, and transmitted back to the local site, and there coupled into the present AEC processor (described in more detail below). The AEC processor processes this returning tone signal to extract associated information about both the remote room acoustic signature and the overall round-trip delay. Knowing the path latency (delay time) of the link and that of the conventional video/audio compression stage in the link improves the echo cancellation.

A buffer (memory) in the AEC processor records and stores all outgoing audio signals for up to, e.g., 2 seconds. When the path delay is calculated, it is used to refer to the original outgoing signal sent previously. This synchronized reference signal is then used to create a simulated echo, which is effectively subtracted from the incoming, "echo-polluted" audio signal to provide a clean, echo-free signal.

In FIGS. 3a, 3b, the waveforms show how the difference in time of the returned vs. the original tone signal is used to determine roundtrip delay. This calculation is updated by the AEC processor every 100 ms in one example. The AEC processor in one embodiment creates a finite impulse response (FIR) model of the room acoustics based on the returned tone response. Since this model changes randomly and preferably is updated frequently, the AEC processor updates the FIR model every, e.g., 100 ms.

The AEC processor as implemented in one embodiment includes a commercially available DSP AEC processor, such as part number AEC G167 from Spirit DSP with conventional support circuitry and with suitable processing algorithm modifications to process tones instead of voice signals; the processor apparatus performs these steps:

1. The returned audio signal from the remote room is filtered and the inaudible embedded tone sequence extracted.
2. The extracted tone sequence is processed using the DSP processor to derive a FIR model for the remote room's acoustics.
3. The FIR model, along with the buffered original tone signal (as synchronized by the delay calculator) are convoluted to create a simulated echo.
4. The simulated echo is subtracted from the incoming audio signal, which eliminates the actual echo. The error signal between the actual echo and the simulated echo is stored and passed back to step 2 to better model the next FIR model (e.g., 100 ms later). Feedback improves the FIR model each iteration. Note that these steps 1-4 occur in the frequency domain.

The following describes the room environment signal processing in terms of equations, where:

a(t) is the local voice coming in from microphone g(t) is the injected tone (specific to a frequency) at specific frequencies f1, f2, ... FN h(t) is the system response of the remote room environment Any compression artifact is assumed to be zero (but can alternatively be measured) and the round-trip latency to be zero. Then:

local source=a(t)

The added injected tone g(t) results in a(t)+g(t); this is the signal transmitted to the remote room.

The remote room environment changes the local audio depending on the room characteristics. This is reflected by signal h(t):

$$[a(t)+g(t)]*h(t)$$

The remote room experiences this audio as well as the audio signal from any remote room participant, which is signal b(t). The resulting input to the local microphone from the remote room is:

$$\text{remote room input}=[a(t)+g(t)]*h(t)+b(t)$$

This audio signal is transmitted back to the local room and can be expressed as:

$$\text{resulting local room audio}=[a(t)+g(t)]*h(t)+b(t) \text{ or as:}$$

$$=[a(t)*h(t)]+[g(t)*h(t)]+b(t) \text{ or}$$

$$=a'(t)+g'(t)+b(t), \text{ where } a'(t)=a(t)*h(t) \text{ and } g'(t)=g(t)*h(t)$$

To obtain the remote voice signal, one extracts the local voice signal a'(t) and the injected tone signal g'(t). For simplicity, the signal g'(t) is subject to notch filtering with the understanding that there is residual audio from a(t) and b(t):

$$a'(t)+g'(t)+b(t)|\text{notch filter}=>g'(t),$$

One generates the h(t) response signal as the sum of individual f components from signal g'(t):

$$H(w) = \sum_{i=0}^{N-1} Hi(w)$$

where Hi is the response for a specific tone, f1, f2, f3, ..., fN, and where signal $h_r(t)$ is derived from $g'(t)=g(t)*h(t)=>Hi(w)=G'(w)/G(w)$ where G(w) corresponds to g(w).

The local room audio=a'(t)+g'(t)+b(t) where a'(t)=a(t)*h(t) and g'(t)=g(t)*h(t). One removes signals a'(t) and g'(t) by reconstructing the original signals a(t) and g(t) from the generated h(t):

One generates a distortion approximation since one knows a(t) and g(t) and has reconstructed h(t):

$$a'(t)est=a(t)*h(t)$$

$$g'(t)est=g(t)*h(t)$$

One extracts the added noise to produce the remote audio signal:

$$\text{local room audio}=[a'(t)-a'(t)est]+[g'(t)-g'(t)est]+b(t)$$

where =>[a'(t)−a'(t)est]=>0 where =>[g'(t)−g'(t)est]=>0, leaving signal b(t) from the remote source, and the local room audio from the remote room=b(t).

The following describes the delay calculation. One uses the delay to better estimate the return echo and room environment calculations. The delay is calculated with signals a(t and b(t) both being zero and only sending signal g(t), or through sequencing through various delays Δt. The delay is optimized by sequencing through various values to minimize the error, [g'(t)−g'(t)est]=>0, using g'(t+Δt;) for i=1, ..., N one finds the optimal Δt.

The delay calculation in the audio processing uses the equation:

$$g'(t)est=g(t+\Delta t)*h(t).$$

and inherently one has a better approximation of the a(t) echo signal (using the same Δt) since one has characterized the delay a'(t)=a(t+Δt) h(t).

Figure 4B:
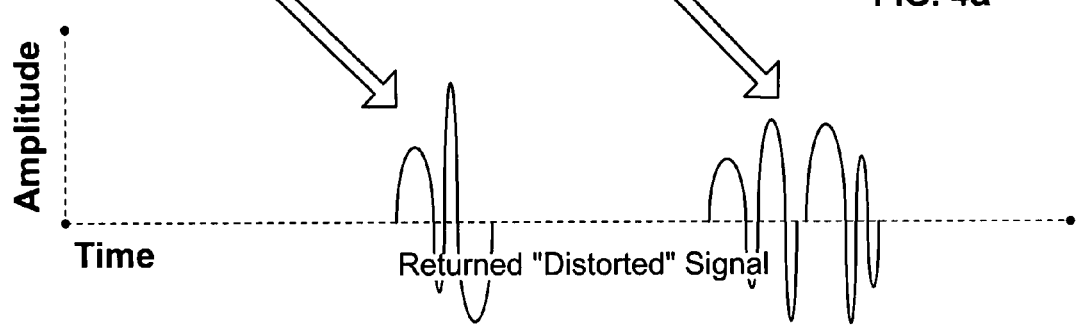
Figure 4C:
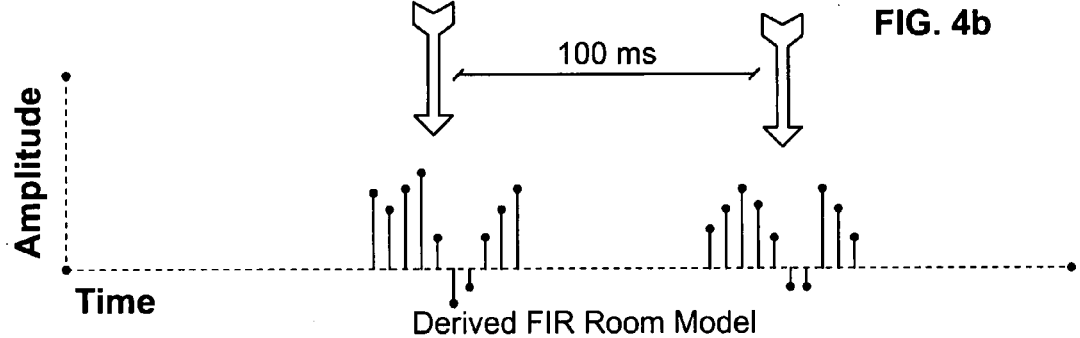

The waveforms of FIGS. 4a, 4b, 4c show how the inaudible tone, upon its return, is extracted from the incoming voice data, and processed to derive a remote room acoustic signature. This process is repeated every 100 ms as described above. FIG. 4a shows the original tone as generated at the local site. FIG. 4b shows the return tone of the FIG. 4a tone as transmitted to the remote site and received back at the local site, and which is expected to be distorted due to the remote site acoustics. FIG. 4c shows the FIG. 4b signal after further digital processing to generate the (digital) FIR model of the remote site acoustics. The FIR model of FIG. 4c is periodically updated regardless of total voice silence during a part of the conference, one way, or double-talk situations since it is entirely dependent on the inaudible tones and not the voice signal. Note that continuous processing of the system response h(t) using a moving average or similar technique allows for errors due to the local voice signal a(t) or the signal from the remote room participant b(t).

The present system is robust and less prone to failure in double-talk and varying network delay situations than prior solutions. The present system advantageously does not depend on the remote site AEC device; processing for echo cancellation is local to each site. Effects of the remote room speaker, microphone, and room acoustics can all be accounted for by adjusting local AEC processor parameters. This makes installation, optimization, adjustments and troubleshooting much easier than for existing AEC processors (which instead rely on the remote room's AEC).

One-to-many video conference connections conventionally exhibit echo cancellations problems because the characteristics are different for different remote sites. By integrating separate paths for each remote room, the present system cancels the echo from multiple conference sites simultaneously. The present system handles each of the remote sites in a multi-site configuration in a parallel manner. Moreover, the tones transmitted to the various sites may be synchronized. FIR room characteristic models are generated for every room (site) and delay calculation may be performed independently for every room as well.

Figure 5A:
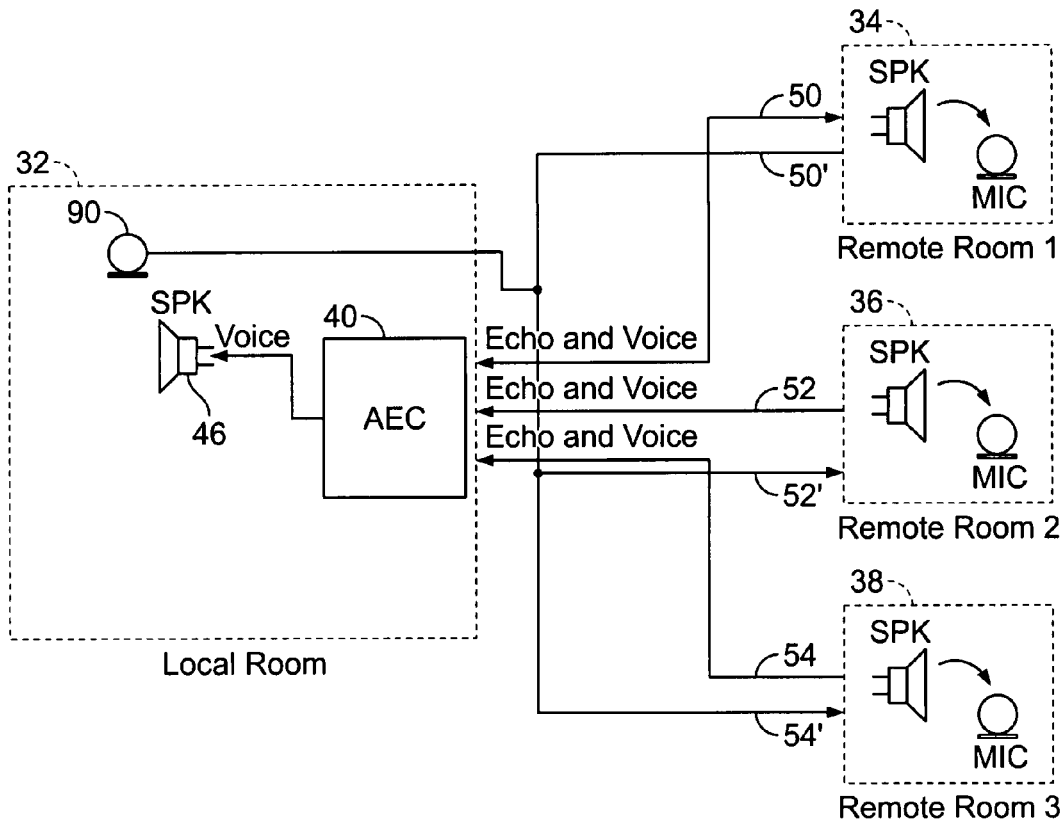
FIG. 5a shows a system in accordance with the invention.

FIG. 5a depicts such a multi-site system in accordance with the invention. The local room 32 receives tone echo (return) and voice data from each remote room 34, 36, 38, coupled to room (site) 32 via respective audio links (ports) 50, 52, 54, each carrying the voice and echo (tone) signals. (Note that links 50, 52, 54 are conventional, e.g., including an Internet connection for Internet protocol communications, or dedicated lines, or telephone lines or other suitable network connections. The network may also conventionally carry associated video, for video conferencing.) The local room AEC processor 40 removes the echo and provides a "clean" output voice signal to the local loud speaker 46. Also shown are the local microphone 90 and its links 50, 52, 54 to the three remote rooms.

Figure 5B:
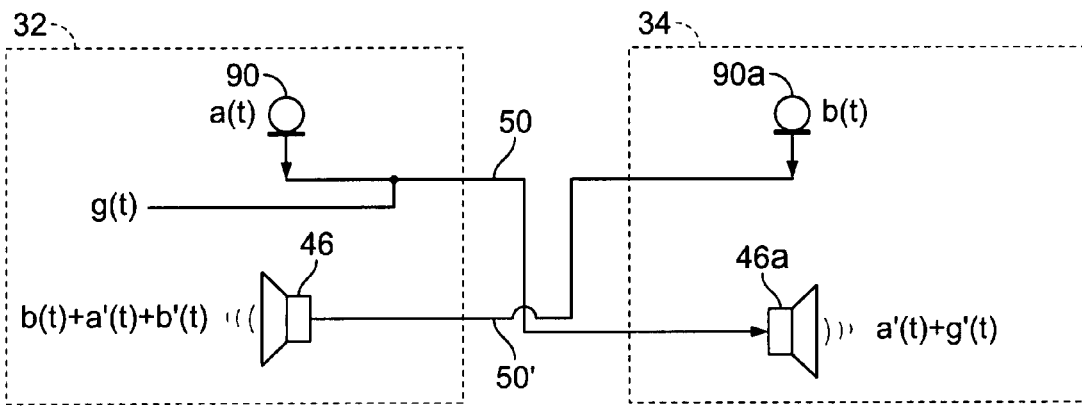
FIG. 5b shows the signal processing in accordance with the invention.

FIG. 5b shows the above described signal processing in the context of one embodiment of the invention, with its elements labeled as described above and also showing the related signal processing equations and variables to illustrate how these relate to the system components, including the remote room microphone 90a and remote room loudspeaker 46a, thereby being self-explanatory.

Figure 6:
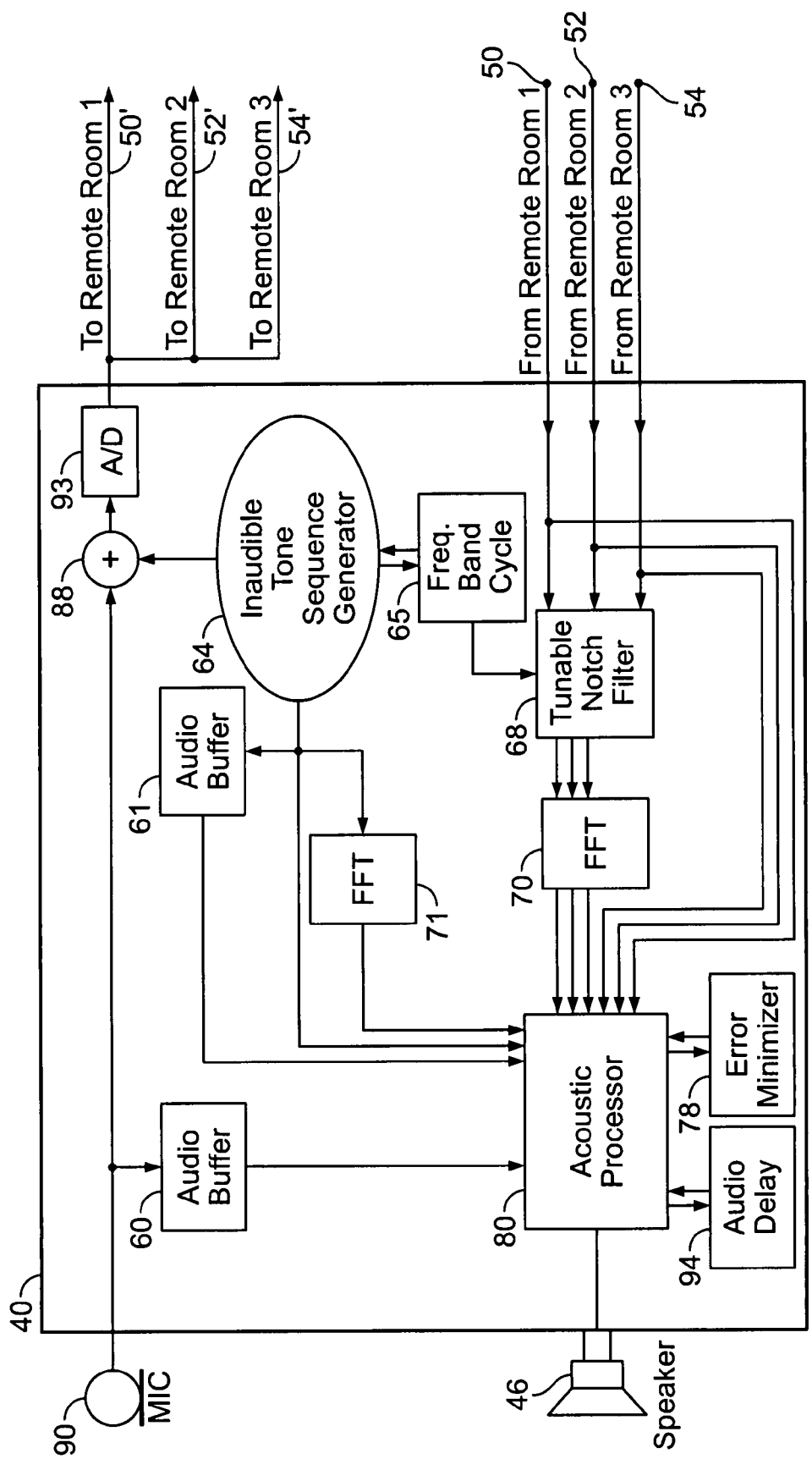

In FIG. 6, an embodiment of the AEC processor 40 of FIG. 5 is shown in detail in a block diagram. For the above described multi-site conferencing (more than two sites), the AEC processor 40 processes in this example three simultaneous remote room characterization models supplied from input ports 50, 52, and 54 and outputs three simultaneous simulated echo signals to output ports 50', 52', and 54'. Each echo signal is then subtracted from the incoming audio signal from the associated remote room to obtain a clean, echo free audio signal. Each depicted element of processor 40 may be hardware or software based or a combination thereof. Starting from the upper left hand side of FIG. 6, microphone 90 (also shown in FIG. 5, with its external connections) supplies its signal picked up from the local room to audio buffer 60 and adder (combiner) 88. Audio buffer 60 is coupled to acoustic processor 80 which is a typical commercially available digital signal processor whose further operation is explain hereinafter.

Coupled to processor 80 is FFT (Fast Fourier Transform) element 71 and second audio buffer 61. From the right hand side of the drawing, the input signals from remote rooms 1, 2 and 3 applied at ports 50, 52 and 54 (in digital form) are coupled to tunable notch filter 68 and then to FFT element 70 and thence to acoustic processor 80. The inaudible tone sequence generator 64, which generates the above described inaudible tones, is coupled to the adder 88 and also to a frequency band cycle element 65 which in turn is coupled to the tunable notch filter 68. At the bottom portion of the drawing, acoustic processor 80 is also coupled to an error minimizer element 78 and audio delay element 94 and outputs an analog signal to drive loud speaker 46.

Figure 7A:
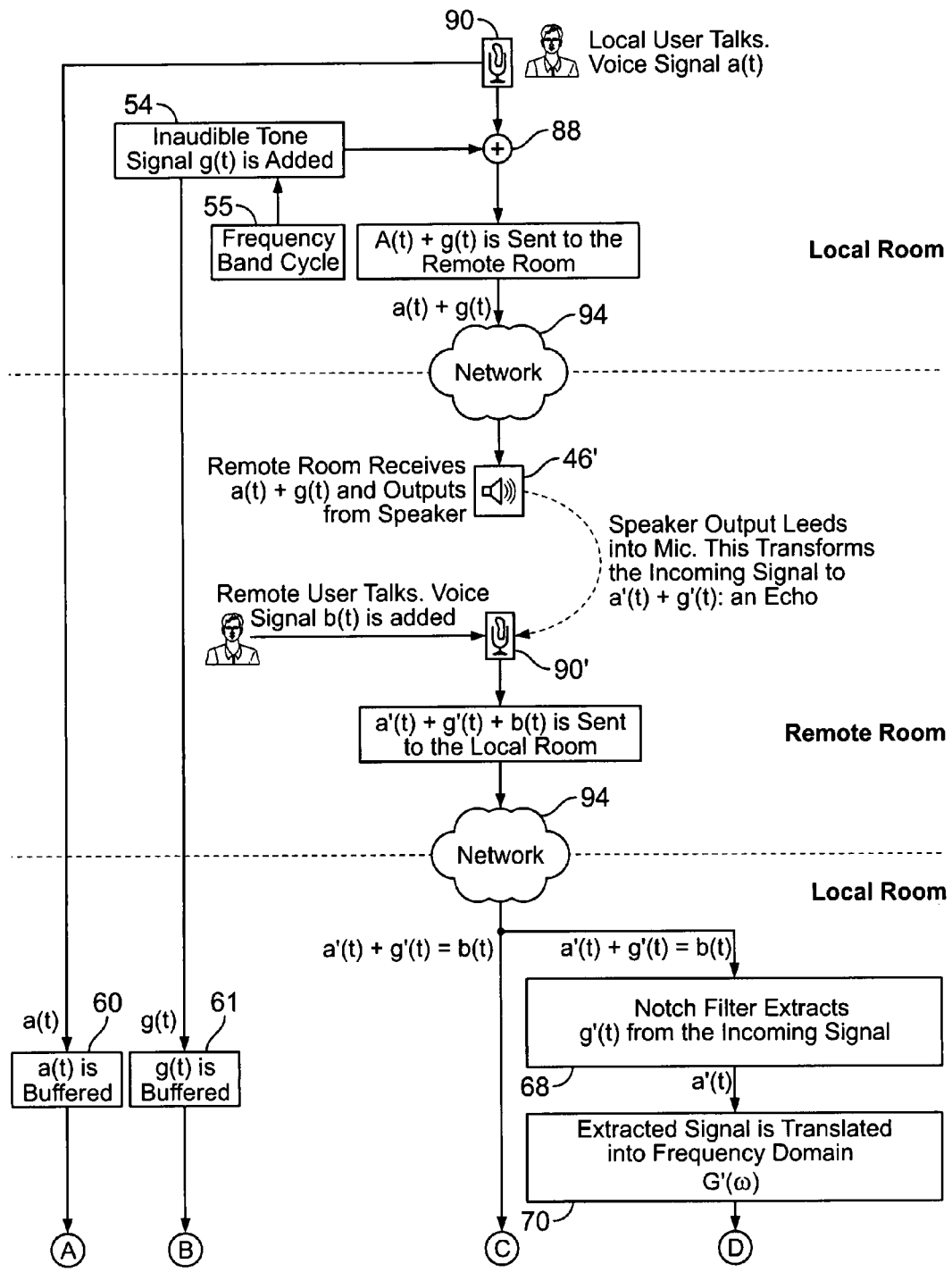
FIGS. 7a, 7b show in a flowchart signal processing in accordance with the invention.
Figure 7B:
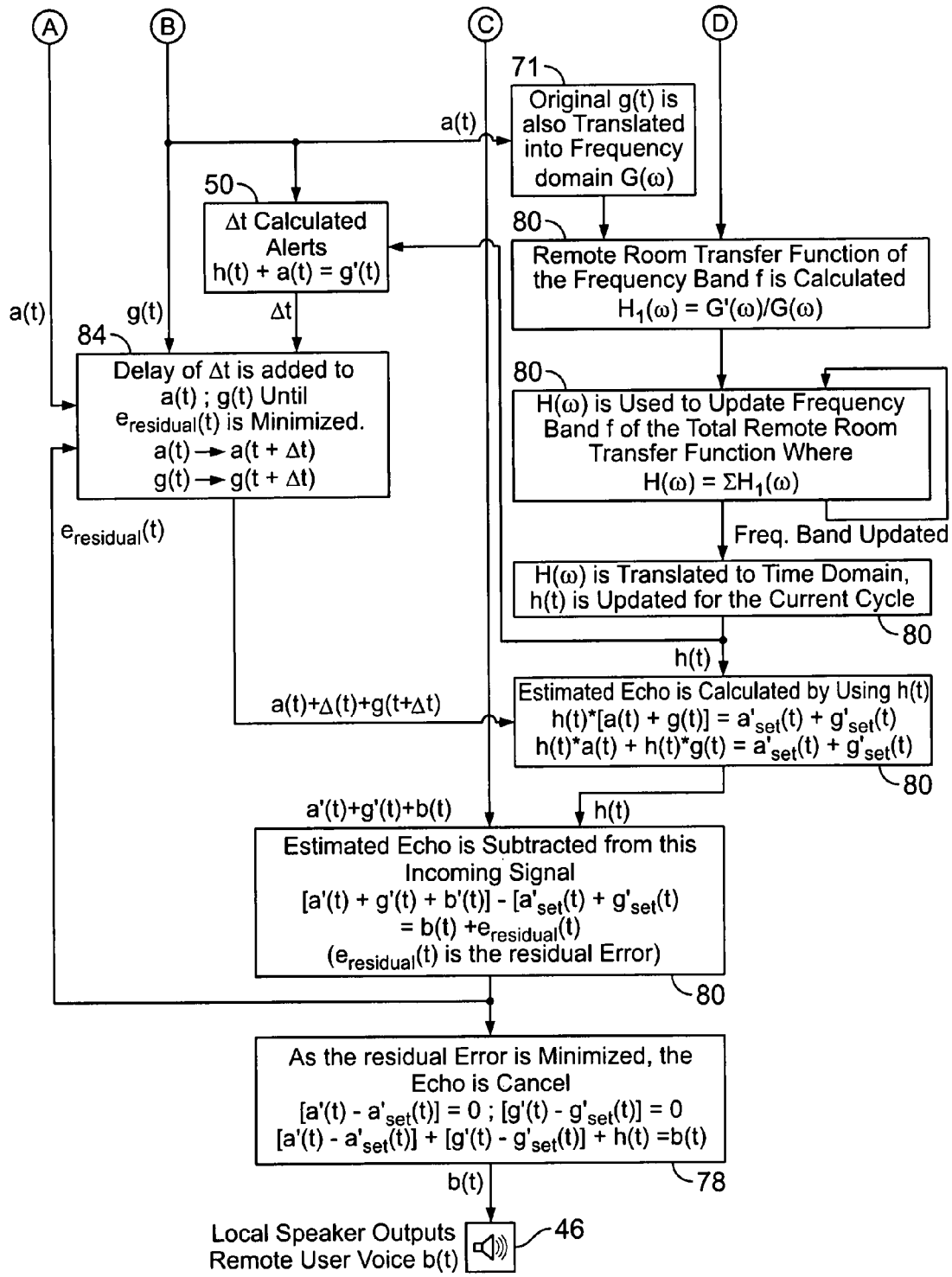

FIGS. 7a, 7b depict in a flowchart the signal processing as carried out by AEC processor 40 in accordance with the invention and is labeled with reference numerals referring to the associated component of FIG. 6 which carries out each indicated function. FIGS. 7a, 7b are thereby annotated with reference numbers relating to the various elements of FIG. 6 and explains in further detail what each of these elements does. Also, FIGS. 7a, 7b the same signal equation notation as used above. The horizontal dotted lines in FIGS. 7a, 7b denote respectively, from the upper part of the drawing, activity in the local room, the remote room and again the local room. As indicated the local room and remote room are connected by the conferencing network 94, as is conventional. For simplicity of illustration, this description refers to signals a(t), g(t), and b(t). In other embodiments, much of the audio processing is carried out in the digital domain using signals a(i), g(i), and b(i) of a specific frequency bin.

Beginning at the top of FIG. 7a microphone 90 receives an analog audio signal when the local user speaks, generating voice signal a(t). This signal is coupled to adder 88. In the upper left hand portion of FIG. 7a the inaudible tone sequencer generator 64 generates its inaudible tone g(t), and is also driven by frequency band cycle element 65. This tone is then combined by adder 88 with the voice signal a(t), and then as shown the combined signal is transmitted to the remote room, via the analog to digital converter 93 and then the network 94 which couples (in FIG. 6) to output ports 50', 52' and 54'. (Note that FIGS. 7a, 7b only show the one-to-one conference, not multipoint conferencing.)

In the center portion of FIG. 7a the remote room receives the signal generated portion of FIG. 7a and outputs it from its local speaker 46', not shown in FIG. 6. Then as shown in FIG. 7a the remote user talks and his voice signal b(t) is picked up by the local microphone 90' in the remote room as well as the loud speaker 46' output signal a'(t)+g'(t), which is an echo. The remote room generates the combined signal a'(t)+g'(t)+b(t) is transmitted to the local room via the network 94 as shown in the middle portion of FIG. 7a. In the left hand portion of FIG. 7a speech signal a(t) is received by audio buffer 60 and the inaudible tone signal g(t) is received and by the second audio buffer 61. Returning to the central portion of FIG. 7b the signal from the remote room is received from the remote room (via ports 50, 52 and 54). This digital signal is then transmitted to the acoustic processor 80 directly as also shown in FIG. 6. (Note that in the FIGS. 7a, 7b the functionality of the acoustic processor 80 is shown as being distributed over a number of different blocks, since this component performs much of the signal processing.)

The signal input from ports 50, 52, 54 is also coupled to the tunable notch filter 68 which extracts the signal g'(t) from the incoming signal. This extracted signal g'(t) is then applied to the FFT element 70 which translates it into the frequency domain, represented as signal G'($\omega$). Continuing with the signal processing in the frequency domain, in the next block the acoustic processor 80 receives from the other FFT element 71 the original g(t) signal which is also translated into the frequency domain by FFT element 71 as signal G($\omega$) and then coupled into processor 80. Processor 80 then performs the remote room transfer function of the frequency band f, as shown in FIF. 7b. In the next step, continuing in the frequency domain, also in the acoustic processor 80 the remote room transfer function H($\omega$) is used to update the frequency band f of the total room transfer function using the equation shown in FIG. 7b. As shown, there is a feedback loop for frequency band updates in order to step through the frequency bands as well as to calculate an historical value of h(t), such as a moving average. In the next step, also carried out by acoustic processor 80, the remote room transfer function H($\omega$) is translated to the time domain function h(t), which is updated for the current processing cycle. This time domain signal h(t) in the next processing step is used to calculate the estimated echo using the two equations shown in the next block in FIG 7b.

Further processing is shown in the left hand portion of FIG. 7b where signal g(t) from audio buffer 61 is also coupled into acoustic processor 80 to calculate the delay (latency) $\Delta t$. This value is then coupled to the audio delay element 94 along with the signals a(t) from buffer 60 and g(t) from buffer 61. Further processing is shown in the block relating to audio delay element 94. Proceeding to the lower portion of FIG. 7b in the next block relating to acoustic processor 80, the estimated echo is subtracted from the incoming signal using the equation shown including the residual error. The residual error then, as shown in FIG. 6, is coupled to the error minimizer element 78 so that as residual error is minimized. The echo is cancelled using the equations shown in the block in FIG. 7b relating to element 78. Error minimizer element 78 corrects the value of signal h(t) for the next iteration. The estimated echo is also coupled back into the echo delay element 94 using the residual error. Finally, in the lowest part of FIG. 7b the local speaker 46 outputs the remote user voice signal b(t) which has been fully processed.

Figure 8:
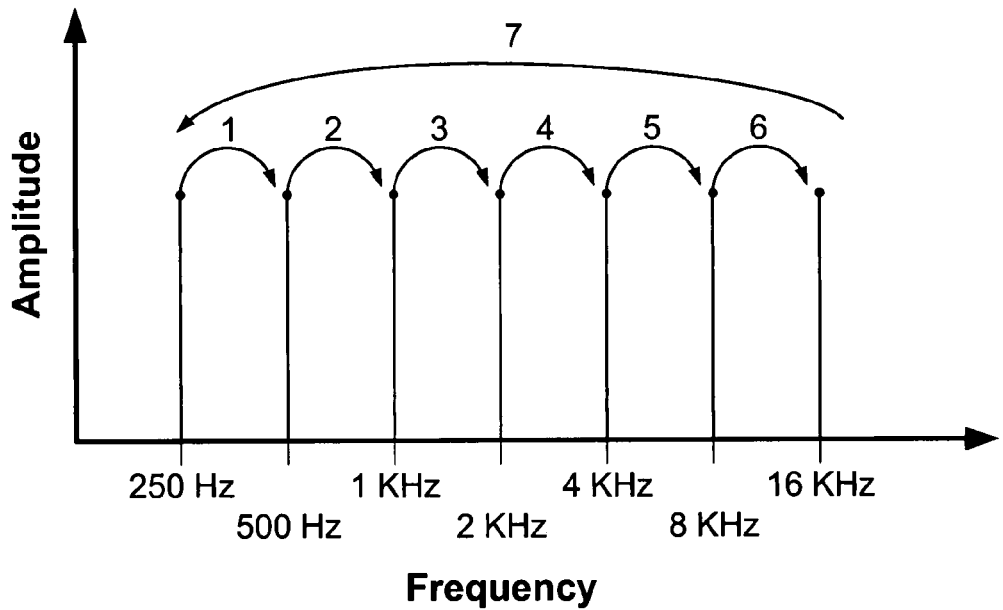
FIG. 8 shows a time elapsed room characterization waveform of the bursts.

FIG. 8 shows, using an acoustic waveform, an example of the time elapsed room characterization process described above, in additional detail, in graphic form. Each embedded tone burst is of a single frequency and has a duration of about 5 ms, in this example. An exemplary interval between two consecutive bursts is 100 ms. The tone burst frequencies cycle through the range of frequencies shown in FIG. 8, then return to 250 Hz, then continue cycling. The frequency bins (ranges, as shown in FIGS. 8 and 9) are evenly spaced or may be focused on specific frequencies.

Figure 9:
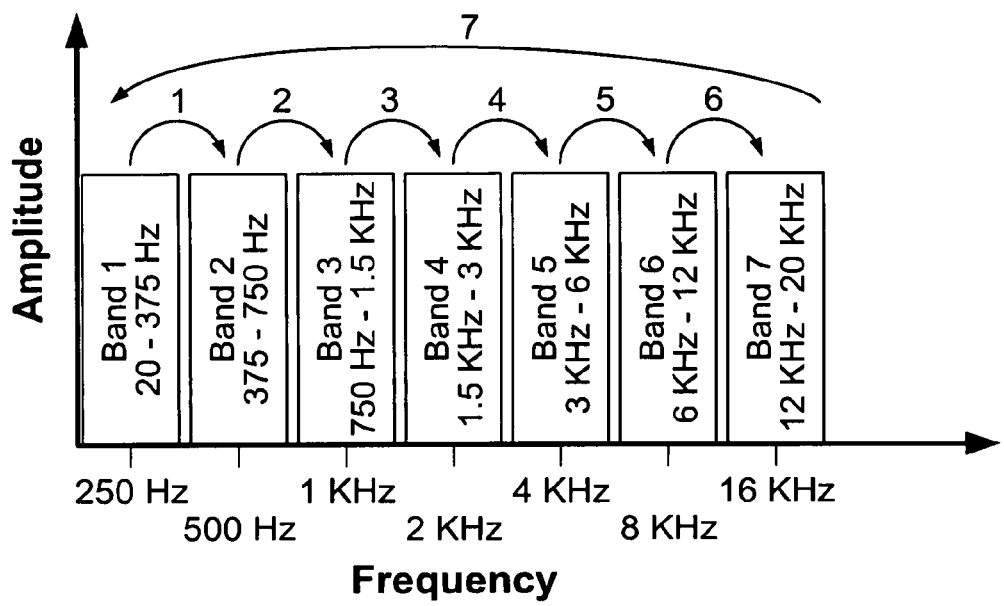
FIG. 9 shows the present FIR model update process graphically.

FIG. 9 shows graphically detail of the FIR model characterization described above. The FIR model is subdivided into seven frequency bands (bins) as shown in this example. Each frequency band is updated at every tone burst return, see FIG. 1. Each frequency band characterization is stored in memory until the cycle returns to it and updates the value for that band. The arrowed lines indicate the flow of the updates. In this example the bins are of equal range in terms of octaves, each being twice the width in terms of Hz as the preceding bin. This arrangement of the bins is illustrative; the bins can be of other widths, as a matter of design choice.

Figure 10:
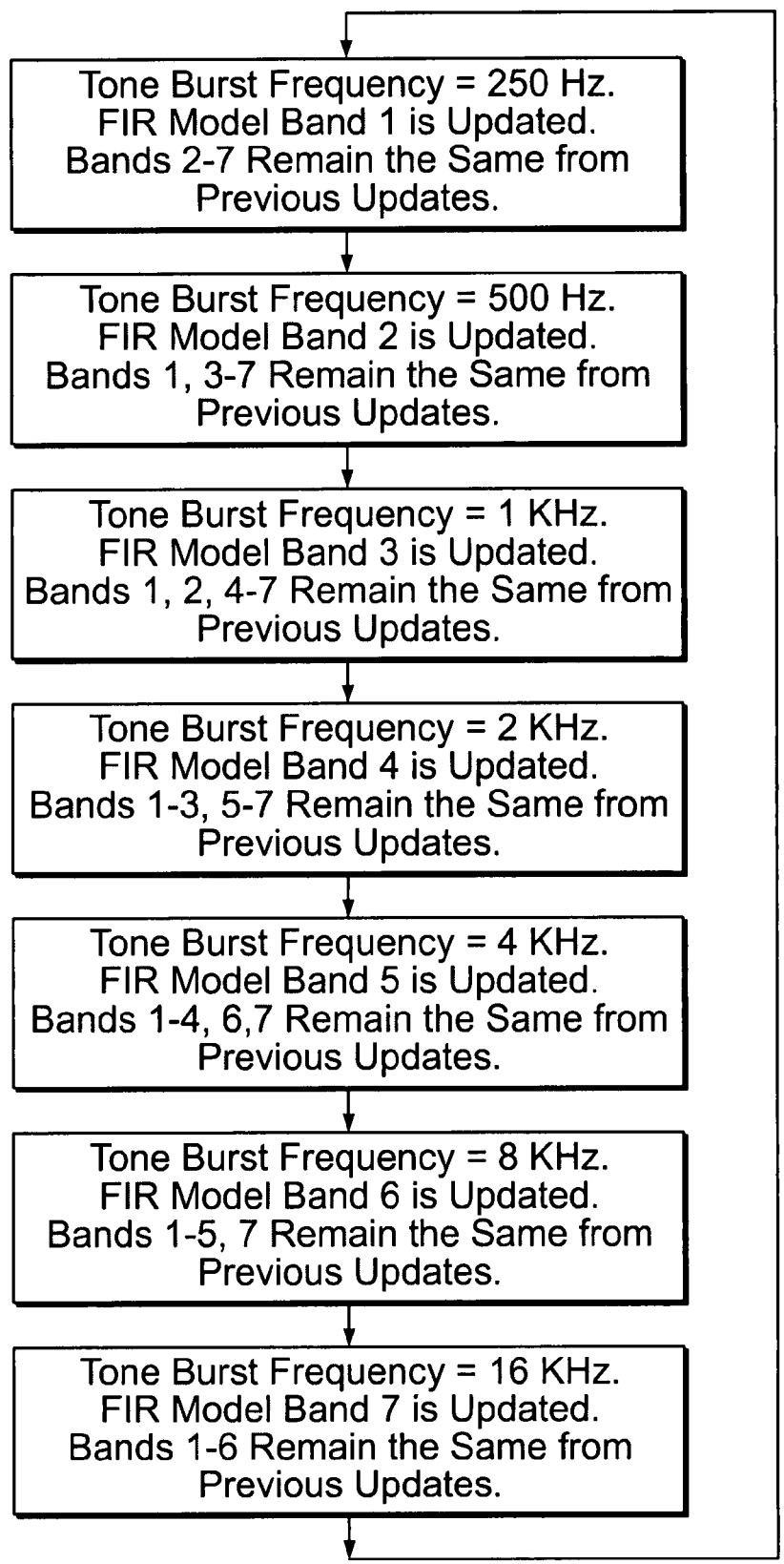
FIG. 10 shows the process of stepping the tone bursts through a range of frequencies, in a flow chart.

FIG. 10 illustrates the process of FIG. 9 in a flowchart, and is self explanatory.

This description is illustrative and not limiting; further modifications will be apparent to one skilled in the art in light of this disclosure, and are intended to fall within the scope of the appended claims.

What is claimed is:

1. A method of conferencing between at least two sites in audio communication, comprising the acts of:
   providing audio at a first of the sites;
   combining a sequence of single frequency tones, each tone being in a frequency range of 250 Hz to 16 KHz and having a duration of less than 5 ms and being substantially inaudible to the human ear with the provided audio wherein the sequence of tones has a length less than one second;
   transmitting the audio with the sequence of tones to the second site;
   playing the received audio with the sequence of tones at the second site;
   providing audio at the second site;
   picking up the played received audio and the provided audio at the second site;
   transmitting the audio picked up at the second site to the first site; and
   at the first site, processing the received audio using the sequence of tones for echo cancellation.

2. The method of claim 1, wherein each tone in the sequence is in the audible frequency band.

3. The method of claim 1, wherein each tone in the sequence is provided at an interval of at least 50 ms duration.

4. The method of claim 1, wherein the processing includes:
   determining from the tones an acoustic signature of the second site; and
   determining from the tones a round trip delay between the two sites.

5. The method of claim 1, wherein the processing includes:
   generating a simulated echo signal from the tone tones; and
   subtracting the simulated echo signal from the audio.

6. The method of claim 5, wherein the generating a simulated echo signal includes providing a finite impulse response model of the second site.

7. The method of claim 6, further comprising updating the model periodically.

8. The method of claim 7, wherein the updating is iterative.

9. The method of claim 7, wherein the updating is of one of a frequency, the model itself, and a latency between the two sites.

10. The method of claim 5, wherein the generating includes:
    extracting the tones from the received audio;
    processing the extracted tones;
    deriving an acoustic model of the first site from the processed extracted tones; and
    simulating an echo signal from the acoustic model.

11. The method of claim 1, wherein the sequence of tones is transmitted to the second site in the temporary absence of other audio at the first site.

12. The method of claim 1, wherein a third site is conferencing with at least one of the first and second sites; and further comprising the acts of:
    providing audio at the third site;
    adding a tone substantially inaudible to the human ear to the audio provided at the third site;
    transmitting the audio with the tone to at least one of the first and second sites; and
    at the third site, processing received audio from the first or second site to provide echo cancellation using the tone added at the third site.

13. The method of claim 1, wherein the echo cancellation includes at least one of determining a transmission delay between the two sites and determining acoustic characteristics of one of the sites.

14. The method of claim 4, wherein the acoustic signature of the second site is optimized using the determined round trip delay.

15. The method of claim 1, further comprising the acts of:
    determining a period when no audio is provided at either site; and
    characterizing an acoustic model of the first site during the period, from the tones.

16. The method of claim 1, wherein processing the received audio includes partitioning the received audio into a plurality of frequency bands, each tone in the sequence corresponding to one of the frequency bands.

17. The method of claim 16, further comprising updating the processing of the received audio for each of the frequency bands for each of a subsequent sequence of tones.

18. Apparatus for conferencing between at least two sites in audio communication comprising:
    an input terminal for receiving a signal representing audio at the first site;
    a tone generator that generates a sequence of single frequency tones, each tone being in a frequency range of 250 Hz to 16 KHz and having a duration of less than 5 ms and being substantially inaudible to the human ear, wherein the sequence of tones has a length less than one second;

a combiner coupled to the terminal and the tone generator to combine the sequence of tones with the audio signal; and an output terminal coupled to the combined and adapted to couple to a link for transmitting the audio with the sequence of tones to the second site.

19. The apparatus of claim 18, wherein each tone in the sequence is in the audible frequency band.

20. The apparatus of claim 18, wherein each tone in the sequence is provided at an interval of at least 50 ms duration.

21. Apparatus for conferencing between at least two sites in audio communication, comprising:

an input terminal adapted to couple to a link for receiving an audio signal from a remote site;

an extractor coupled to the input terminal, and adapted to extract from the audio signal a predetermined sequence of single frequency tones, each tone being in a frequency range of 250 Hz to 16 KHz and having a duration of less than 5 ms and being substantially inaudible to the human ear, wherein the sequence of tones has a length less than one second;

processing circuitry coupled to the extractor and the input terminal and which processes the audio signal to provide echo cancellation using the extracted sequence of tones; and an output terminal coupled to the processing circuitry to output the audio signal with echo cancellation.

22. The apparatus of claim 21, wherein each tone in the sequence is in the audible frequency band.

23. The apparatus of claim 21, wherein each tone in the sequence is provided at an interval of at least 50 ms duration.

24. The apparatus of claim 21, wherein the processing circuitry:

determines from the tones an acoustic signature of the remote site; and determines from the tones a round trip delay between the two sites.

25. The apparatus of claim 21, wherein the processing circuitry:

generates a simulated echo signal from the tones; and
subtracts the simulated echo signal from the audio.

26. The apparatus of claim 25, wherein generating a simulated echo signal includes providing a finite impulse response model of the first site.

27. The apparatus of claim 26, wherein the model is updated periodically.

28. The apparatus of claim 27, wherein the updating is iterative.

29. The apparatus of claim 27, wherein the updating is of one of a frequency, the model itself, and a latency between the two sites.

30. The apparatus of claim 25, wherein the generating includes:

extracting the tones from the received audio;
processing the extracted tones;
deriving an acoustic model of the remote site from the processed extracted tones; and
simulating an echo signal from the acoustic model.

31. The apparatus of claim 21, wherein the sequence of tones is extracted in the temporary absence of other audio transmitted from the remote site.

32. The apparatus of claim 21, wherein a third site is conferencing with at least one of the other two sites; and the processing circuitry:

processes the received audio from one of the other two sites to provide echo cancellation using the tones.

33. The apparatus of claim 21, wherein the processing circuitry determines at least one of a transmission delay between the two sites and acoustic characteristics of one of the sites.

34. The apparatus of claim 21, wherein the processing circuitry partitions the received audio signal into a plurality of frequency bands, each tone in the sequence corresponding to one of the frequency bands.

35. The apparatus of claim 34, the processing circuitry updating the processing of the received audio signal for each of the frequency bands for each of a subsequent sequence of tones.

36. Apparatus for conferencing between at least two sites in audio communication, comprising:

an output section including:
an input terminal for receiving a signal representing audio at the first site;
a tone generator that generates a sequence of single frequency tones, each tone being in a frequency range of 250 Hz to 16 KHz and having a duration of less than 5 ms and being substantially inaudible to the human ear, wherein the sequence of tones has a length less than one second;
a combiner coupled to the terminal and the tone generator to combine the sequence of tones with the audio signal; and
an output terminal coupled to the combined and adapted to couple to a link for transmitting the audio with the sequence of tones to the second site; and an input section including:
an input terminal adapted to couple to a link for receiving an audio signal from the second site;
an extractor coupled to the input terminal, and adapted to extract from the audio signal a predetermined sequence of tones which is substantially inaudible to the human ear;
processing circuitry coupled to the extractor and the input terminal and which processes the audio signal to provide echo cancellation using the extracted tones; and
an output terminal coupled to the processing circuitry to output the audio signal with echo cancellation.

* * * * *

UNITED STATES PATENT AND TRADEMARK OFFICE
CERTIFICATE OF CORRECTION

| | |
|---|---|
| PATENT NO. | : 8,391,472 B2 |
| APPLICATION NO. | : 11/810836 |
| DATED | : March 5, 2013 |
| INVENTOR(S) | : Adnan N. Ghani et al. |

It is certified that error appears in the above-identified patent and that said Letters Patent is hereby corrected as shown below:

In the Specification:

In column 6, line 30, delete (second occurrence) of "and" and insert -- and stored --.
In column 6, line 50, delete "FIF." and insert -- FIG. --.

In the Claims:

In column 8, line 7, in claim 5, after "the" delete "tone".

Signed and Sealed this
Twenty-eighth Day of May, 2013

Teresa Stanek Rea
*Acting Director of the United States Patent and Trademark Office*